(12) United States Patent
Furuta

(10) Patent No.: US 10,203,190 B2
(45) Date of Patent: Feb. 12, 2019

(54) MEASURING DEVICE

(71) Applicant: MITUTOYO CORPORATION, Kawasaki, Kanagawa (JP)

(72) Inventor: Makoto Furuta, Nakatsugawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 205 days.

(21) Appl. No.: 15/344,874

(22) Filed: Nov. 7, 2016

(65) Prior Publication Data

US 2017/0167840 A1 Jun. 15, 2017

(30) Foreign Application Priority Data

Dec. 15, 2015 (JP) ................ 2015-244669

(51) Int. Cl.
| | | |
|---|---|---|
| *G01B 3/22* | (2006.01) | |
| *G01B 3/00* | (2006.01) | |
| *G01B 5/20* | (2006.01) | |
| *G01B 21/04* | (2006.01) | |
| *G01B 3/10* | (2006.01) | |

(52) U.S. Cl.
CPC .............. *G01B 3/004* (2013.01); *G01B 5/20* (2013.01); *G01B 21/047* (2013.01); *G01B 2003/1064* (2013.01)

(58) Field of Classification Search
CPC ....................................................... G01B 3/56
USPC ................... 33/501, 569, 571, 832
See application file for complete search history.

(56) References Cited

U.S. PATENT DOCUMENTS

| | | | | | |
|---|---|---|---|---|---|
| 4,126,940 | A | * | 11/1978 | Lendi ....................... | G01B 3/24 33/501.2 |
| 4,146,968 | A | * | 4/1979 | Tovey ....................... | G01B 5/12 33/542 |
| 4,186,492 | A | * | 2/1980 | Gattesco .................. | G01B 3/20 33/796 |
| 5,454,175 | A | * | 10/1995 | Li ............................. | G01B 3/46 33/542 |
| 5,960,553 | A | * | 10/1999 | Ishii ......................... | G01B 3/22 33/556 |
| 6,925,727 | B2 | | 8/2005 | Ishii et al. | |
| 2003/0126754 | A1 | * | 7/2003 | Berger ..................... | F42B 35/00 33/506 |
| 2004/0181960 | A1 | * | 9/2004 | Sugai ....................... | G01B 3/22 33/792 |
| 2004/0200088 | A1 | * | 10/2004 | Ishii ......................... | G01B 3/22 33/832 |

(Continued)

FOREIGN PATENT DOCUMENTS

| | | |
|---|---|---|
| JP | 3675587 B2 | 7/2005 |
| JP | 4399186 B2 | 1/2010 |

*Primary Examiner* — George B Bennett
(74) *Attorney, Agent, or Firm* — Oliff PLC

(57) ABSTRACT

A measuring device which reduces reading errors caused by parallax. The measuring device has a gauge head abutting against an object to be measured, and includes a pointer-type display part which displays displacement of the gauge head obtained by being enlarged by an enlarging mechanism and being converted into a rotation amount of a pointer. The measuring device further includes a transparent cover plate provided so as to cover the pointer-type display part, and the cover plate has an antireflection film on the surface. The cover plate further has an antifouling film on the antireflection film. The cover plate has a flat surface.

4 Claims, 6 Drawing Sheets

(56) References Cited

U.S. PATENT DOCUMENTS

| | | | |
|---|---|---|---|
| 2012/0214004 A1* | 8/2012 | Hashimoto | C03C 15/00 428/428 |
| 2014/0033554 A1* | 2/2014 | Nahum | G06F 9/44505 33/784 |
| 2015/0286354 A1* | 10/2015 | Niwano | G01B 3/22 715/831 |
| 2018/0022630 A1* | 1/2018 | Fukushi | C03B 23/0252 65/30.14 |

* cited by examiner

MEASURING DEVICE

INCORPORATION BY REFERENCE

This application is based upon and claims the benefit of priority from Japanese patent application No. 2015-244669, filed on Dec. 15, 2015, the disclosure of which are incorporated herein in its entirety by reference.

BACKGROUND OF THE INVENTION

1. Field of the Invention

The present invention relates to a measuring device. More specifically, the present invention relates to a measuring device having a pointer-type display part such as a lever-type dial gauge and a dial gauge.

2. Description of Related Art

There is known a lever-type dial gauge (JP 3675587 B and JP 4399186 B). The lever-type dial gauge is used to inspect whether there is a machining error or whether the error is within a tolerance by performing comparative measurement mainly between a master or a block gauge and an object to be measured. The comparative measurement by the lever-type dial gauge has an extremely important role in inspection of dimensional accuracy of products.

SUMMARY OF THE INVENTION

If the exactly same lever-type dial gauge is used, the inspection result is frequently different from measurer to measure. As a result of the earnest investigation of the cause, the inventors of the present invention noticed that measurers' unintentional posture change is one of the reasons.

To perform comparative measurement, measurers should not change the posture when reading a scale. If the measurer changes the posture when measuring a master from that when measuring an object to be measured, the visual line to read the scale is changed, and the difference in the visual line directly causes a measurement error.

The reason why the measurer unintentionally changes the posture is that the pointer and the scale (graduation line) can be difficult to see sometimes.

FIG. 1 is a diagram illustrating a using state of a lever-type dial gauge 80. Typically, the lever-type dial gauge 80 is mainly used with a display part 82 facing upward. Then, light of the illumination on the ceiling reflects on a cover plate 83.

If the cover plate 83 has a slightly curved convex surface, the reflection is dispersed into a plurality of weak reflection spots 91. However, light in various directions is reflected on the cover plate 83.

If the cover plate 83 has a flat surface, light in only one direction is reflected, but a large strong reflection spot 91 appears.

Although a measurer determines the posture so as to easily see the pointer position (reference point) when a master or a gauge is measured, if the pointer position when a workpiece (object to be measured) is measured is covered with the reflection spot 91, the measurer changes the posture to read the scale (graduation line) indicated by a pointer 84.

In another case, when the difference in height between the left and the right of an object to be measured is measured, a dial gauge is moved to a measurement point to perform the measurement. For example, a dial gauge is attached to a jig or the like, and the reference point is adjusted at the measurement point of the left end of the object to be measured. Then, the dial gauge is moved together with the jig, and the difference from the reference point is read at the measurement point of the right end. In this measurement, although illumination is not reflected at the time when the reference point is adjusted, the illumination can be reflected at the position to which the dial gauge is moved. In this case, the measurer unintentionally changes the posture at the position to read the scale, which leads to a measurement error.

It is supposed to start the measurement of the master or the gauge again, but the remeasurement is troublesome. Furthermore, not all users correctly recognize the importance of not changing the posture, that is, fixing the angle of the visual line.

Thus, a purpose of the present invention is to provide a measuring device which reduces reading errors caused by parallax.

A measuring device according to an embodiment of the present invention has a gauge head to be contacted to an object to be measured, and includes:

a pointer-type display part configured to display displacement of the gauge head obtained by being enlarged by an enlarging mechanism and converted into a rotation amount of a pointer; and a transparent cover plate provided so as to cover the pointer-type display part, in which the cover plate has an antireflection film on a surface.

In an embodiment of the present invention, it is preferable that the cover plate further has an antifouling film on the antireflection film.

In an embodiment of the present invention, it is preferable that the cover plate has a flat surface.

In an embodiment of the present invention, it is preferable that the pointer-type display part has a graduated dial plate, and the dial plate is rotatable about an axis of the pointer.

In an embodiment of the present invention, it is preferable that the measuring device is a lever-type dial gauge or a dial gauge.

DETAILED DESCRIPTION

Figure 1:
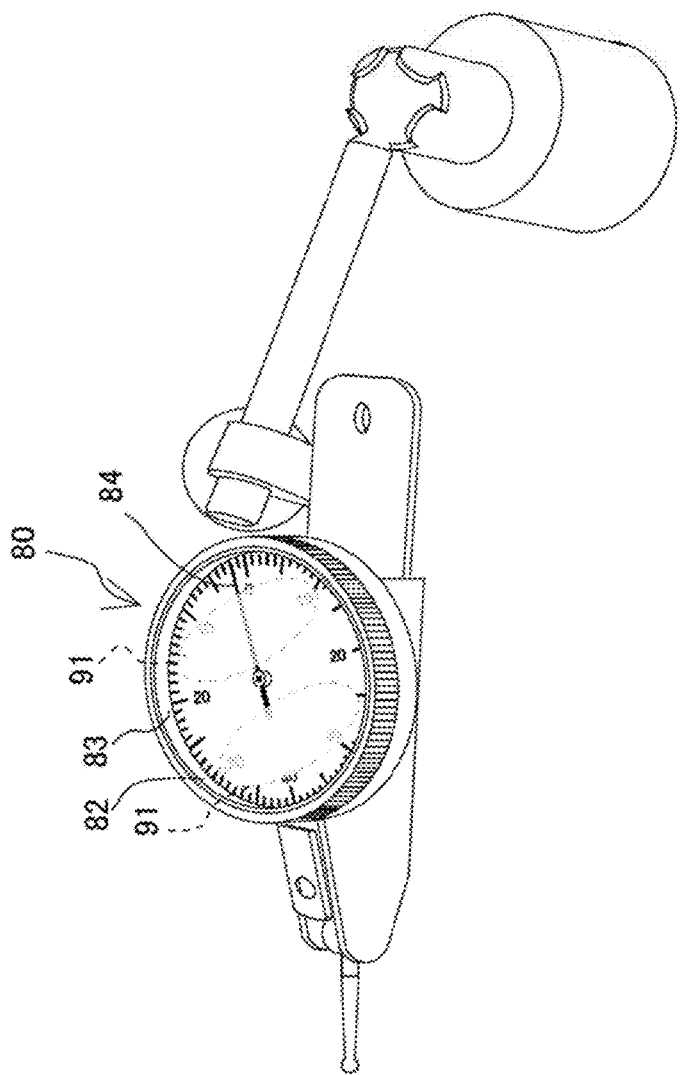
FIG. 1 is a diagram illustrating a using state of a lever-type dial gauge.

An embodiment of the present invention is illustrated and described with reference to the reference signs attached to the elements in the drawings.

First Exemplary Embodiment

In the present embodiment, a dial gauge 10 is exemplified, but the present invention is effective in a lever-type dial gauge 80, a pointer display type caliper, or micrometer. In other words, the present invention is effective in any of pointer display type small measuring devices.

Figure 2:
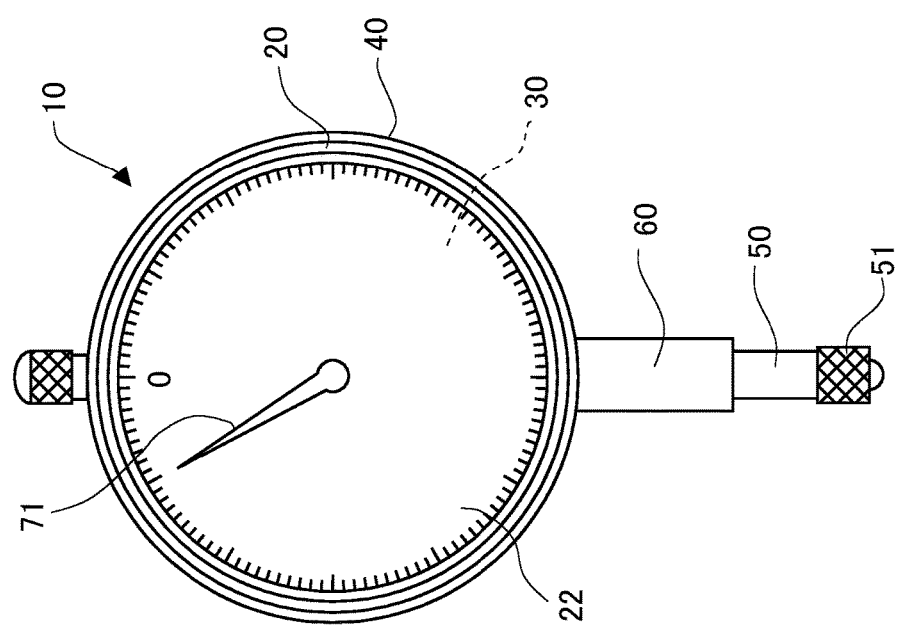
FIG. 2 is a front view of a dial gauge (measuring device)

FIG. 2 is a front view of the dial gauge 10 (measuring device).

Figure 3:
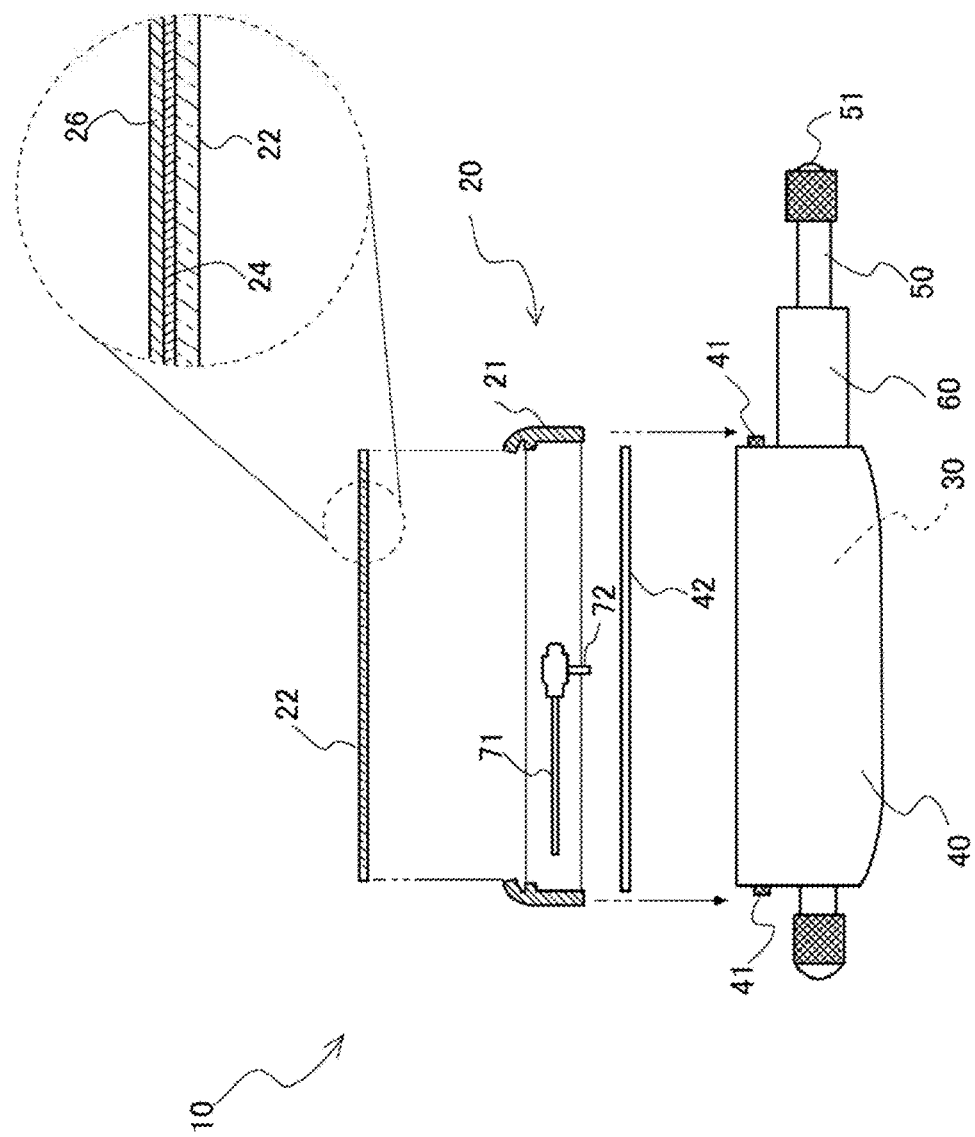
FIG. 3 is an exploded view of the dial gauge (measuring device)

FIG. 3 is an exploded view of the dial gauge 10 (measuring device).

The dial gauge 10 is to display displacement of a spindle 50 as a rotation amount of a pointer 71.

The dial gauge 10 includes a main body case 40, a spindle 50, an enlarging mechanism 30, and a main body cover 20.

The main body case 40 is a short cylindrical case body one end face of which is opening. A stem 60 is provided in a protruding manner on the side face of the main body case 40, and the stem 60 is a bearing of the spindle 50.

The spindle 50 has a gauge head 51 at the tip, and the based end side is housed in the main body case 40. The spindle 50 is supported by the stem 60 so as to be movable backward and forward in the axis direction.

The enlarging mechanism 30 enlarges and converts linear displacement of the spindle 50 into a rotation amount of a pointer 71. The enlarging mechanism 30 is formed by combining a plurality of gears and housed inside the main body case 40. The enlarging mechanism 30 has a pinion (not illustrated) which engages with a rack (not illustrated) provided to the spindle 50, and enlarges the rotation of the pinion with a plurality of gear trains.

The main body cover 20 has an external frame part 21 and a cover plate 22.

The external frame part 21 is a short cylinder both ends of which are opening, and attached to the opening side end face of the main body case 40 by sandwiching, for example, an O ring 41 in-between.

Here, when the external frame part 21 is attached to the end face of the main body case 40, by sandwiching a dial plate 42 between the end face of the main body case 40 and the external frame part 21, the dial plate 42 is fixed to the end face of the main body case 40.

Furthermore, the pointer 71 is arranged on the dial plate 42, and a pointer axis 72 is coupled to a center pinion (not illustrated) which is the final stage of the enlarging mechanism 30.

Here, the pointer 71 and the dial plate 42 constitute a pointer-type display part.

The external frame part 21 is rotatable with respect to the main body case 40, and when the external frame part 21 is rotated, the dial plate 42 is rotated about an axis 72 of the pointer 71 together with the external frame part 21.

By rotating the dial plate 42, it is possible to adjust the position of the origin ("0" on the dial plate) to an arbitrary position, and the measurement value of, for example, a master or a block gauge is adjusted to the origin ("0" on the dial plate).

The cover plate 22 is a transparent disk-shape thin plate. The cover plate 22 may be glass or may be formed of transparent resin such as acrylic resin. The cover plate 22 is fixed to the end face of the external frame part 21 so as to close the opening face of the external frame part 21.

In the present embodiment, the cover plate 22 has a front and a rear faces which are flat.

There is also known a convexly curved cover plate 22, and the convexly curved cover plate 22 may be used in the present embodiment.

However, if the cover plate 22 is convex, the scale and the pointer look slightly distorted due to refraction of light. Thus, it is desirable that the cover plate 22 is plane. For example, in precise measurement, in which a scale (graduation) is 0.001 mm, the clearly recognizable difference appears.

Conventionally, since reflection largely appears and impairs the visibility if a cover plate is plane, a cover plate has been convex to diminish the influence although affected by refraction of light. In this regard, by performing antireflection processing to the cover plate 22 in the present embodiment as described later, it is possible to use a complete plane cover plate 22 which is not affected by refraction of light, and to achieve both of visibility and high-precision measurement.

The cover plate 22 is subjected to antireflection processing, that is, an antireflection film 24 (AR coating) is formed on the surface of the cover plate 22.

The antireflection film 24 may be monolayer or multilayer. Furthermore, the antireflection film 24 may be formed only on the surface of the cover plate 22 or on both of the front and the rear surfaces. The wavelength region or reflectivity of corresponding light is not particularly limited. Actually, these are determined according to a grade or price of a product.

However, if the antireflection film 24 is not provided, in the case of acrylic resin or the like commonly used as cover plate materials, the reflectivity is about 8%, and a measurer clearly sees a reflection spot 91 by illumination.

Thus, in order for the measurer not to unconsciously change the posture without caring about a reflection spot at all, the reflectivity of light on the cover plate 22 is to be less than 1%, preferably less than 0.5%, and more preferably less than 0.2%. By providing the antireflection film 24, the reflection spot is eliminated, and the measurer does not unintentionally change the posture.

Most of factories use bright illumination for workers' working efficiency or ensuring security. Furthermore, because of high reflectivity of the walls, there are reflection materials, such as a metal member, in many factories. Thus, a factory is an environment in which strong reflection spots easily appear on a plurality of positions of the cover plate 22, and the positions of reflection spots are greatly changed according to the using place in the factory.

Note that, when the dial gauge 10 is used, the gauge head does not always face downward, and the dial gauge is mainly used in a lateral posture.

Furthermore, when products are inspected, the position (graduation) indicated by the pointer 71 is to be a different value in one rotation (360°) according to a workpiece. Although the scale and the pointer 71 are easily seen at the time when the reference point is adjusted firstly, it does not necessarily mean that the scale (graduation) and the pointer 71 are easily seen when a workpiece (object to be measured) is measured. The pointer 71 can be easily seen or difficult to be seen according to the measurement value of a workpiece (object to be measured).

Thus, variation in measurement values can be caused depending on a measurer, a measurement place, or a workpiece (object to be measured).

In this regard, since the reflection spots are eliminated by the antireflection film 24 in the present embodiment, the measurer does not unintentionally change the posture.

Not only when the scale (graduation line) indicated by the pointer 71 is read and but also when the dial plate 42 is rotated to adjust the reference point, the measurer does not unintentionally change the posture.

Thus, with the dial gauge 10 (measuring device) of the present embodiment, it is possible to stably perform measurement.

Furthermore, the cover plate 22 has an antifouling film 26 on the antireflection film 24.

The antifouling film 26 preferably has water repellency and oil repellency such as fluoro-resin coating.

In the place where the dial gauge 10 (measuring device) is used, machine oil or cutting oil are used.

Such oil can be attached to the cover plate 22 by splashing or floating in the air. Furthermore, the cover plate 22 can be unintentionally wiped with dirty hands to clearly see the display part.

If oil films are attached on some positions of the cover plate 22, a measurer unintentionally changes the posture to read the pointer 71 or the scale.

In this regard, by performing the antifouling processing to the cover plate 22 not to get dirty in the present embodiment, the visibility of the pointer 71 cannot be impaired.

Thus, in a severe environment such as a factory, the visibility of the pointer 71 or the scale is enhanced, and measurement errors caused by parallax are extremely reduced.

Experimental Example

An experimental example is described below.

Figure 4:
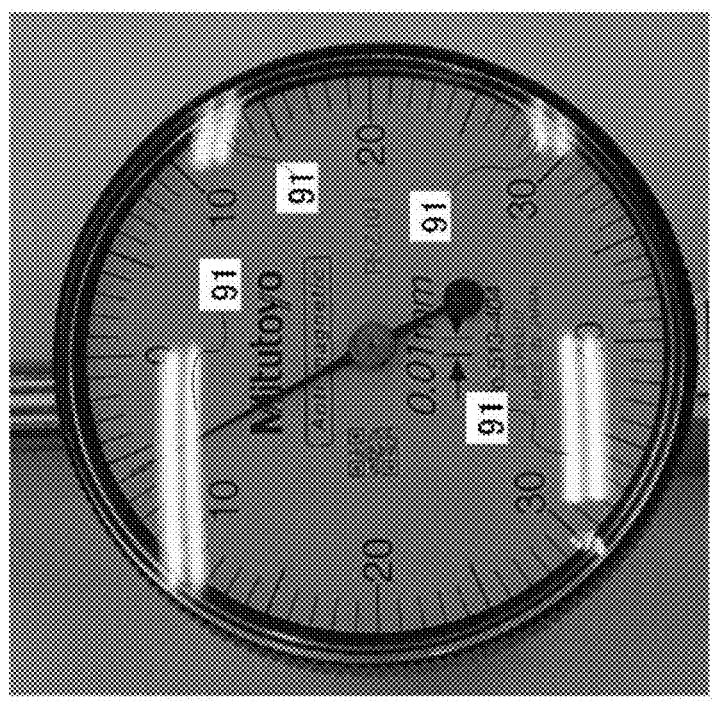
FIG. 4 is a diagram illustrating an experimental example in the case that a cover plate having a convexly curved surface with no antireflection film is used.

FIG. 4 is a cover plate having a convexly curved surface with no antireflection film.

The illumination is reflected on the cover plate, the four reflection spots 91 appear.

Figure 5:
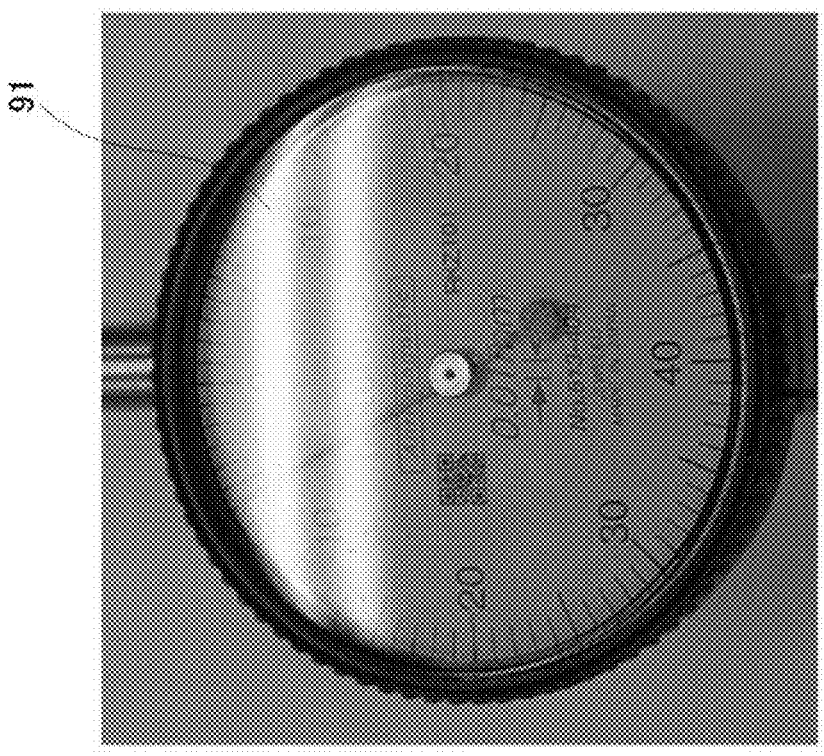
FIG. 5 is a diagram illustrating an experimental example in the case that a cover plate having a flat surface with no antireflection film is used.

FIG. 5 illustrates a cover plate having a flat surface with no antireflection film.

Although the reflection spot 91 is one, the large and strong reflection spot appears on the surface of the cover plate.

Figure 6:
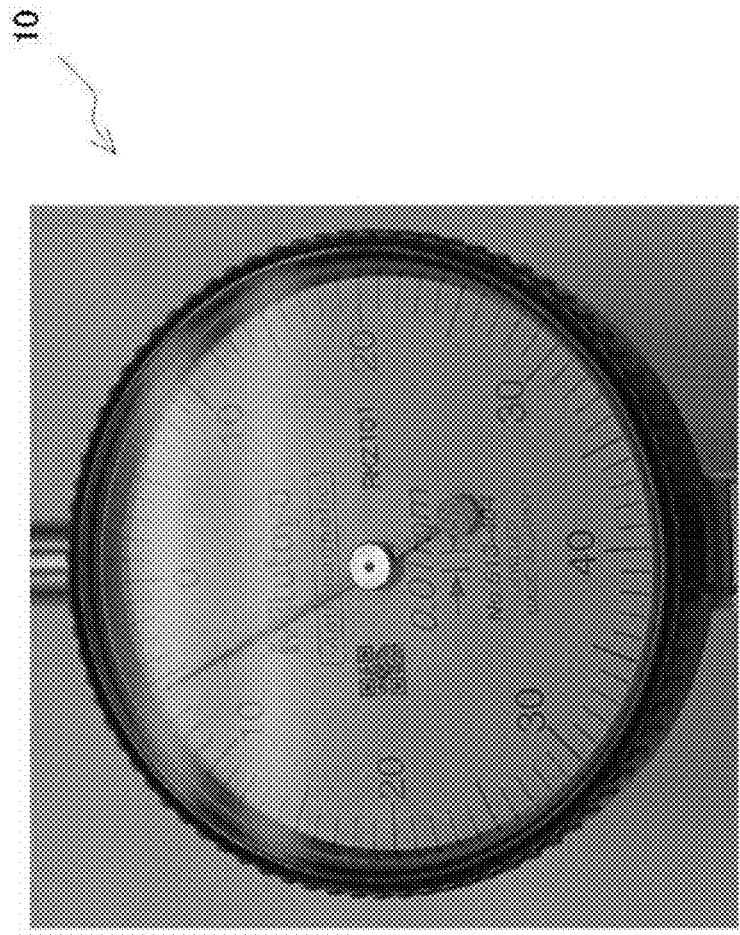
FIG. 6 is a diagram illustrating an experimental example using an embodiment of the present embodiment.

In contrast, FIG. 6 is an example of the present embodiment.

There is no reflection spot on the surface of the cover plate, the pointer and the scale are clearly seen although the pointer 71 is positioned anywhere in one rotation.

Note that, the present invention is not limited to the above embodiment, configurations appropriately changed without deviating from the scope belong to the technical scope of the present invention.

The invention claimed is:

1. A measuring device having a gauge head to be contacted to an object to be measured, the measuring device comprising:
   a pointer-type display part configured to display displacement of the gauge head obtained by being enlarged by an enlarging mechanism and converted into a rotation amount of a pointer; and
   a transparent cover plate provided so as to cover the pointer-type display part, wherein
   the cover plate has an antireflection film on a surface, and
   a surface of the cover plate is a flat face.

2. The measuring device according to claim 1, wherein the cover plate further has an antifouling film on the antireflection film.

3. The measuring device according to claim 1, wherein the pointer-type display part has a graduated dial plate, and the dial plate is rotatable about an axis of the pointer.

4. The measuring device according to claim 1, wherein the measuring device is a lever-type dial gauge or a dial gauge.

* * * * *